United States Patent Office 2,768,959
Patented Oct. 30, 1956

2,768,959

PROCESSING OF SULFUR-CONTAINING SOLID MATERIALS

Adolf Johannsen, Ludwigshafen (Rhine), Willi Danz, Ludwigshafen (Rhine), Oggersheim, Wilhelm Pfannmueller, Mannheim, and Herbert Wolf, Ludwigshafen (Rhine), Germany, assignors to Badische Anilin- & Soda-Fabrik Aktiengesellschaft, Ludwigshafen am Rhein, Germany No Drawing. Application February 6, 1952,
Serial No. 270,284

Claims priority, application Germany February 22, 1951

3 Claims. (Cl. 252—417)

This invention relates to improvements in the processing of solid materials containing sulfur in elementary form.

It is already known to roast exhausted gas purifying masses containing sulfur in amounts of up to about 50% in rotary tubular furnaces or furnaces provided with mechanical stirrers, which have been developed for the roasting of finely-grained pyrites. Exhausted sulfur-containing catalytic masses can also be worked up in this way.

We have now found that solid materials containing sulfur in elementary form, such as exhausted gas purifying masses or minerals containing elementary sulfur or sulfur-containing catalytic masses, can be roasted with advantage by supplying them, if necessary in a comminuted state, to a layer consisting predominantly of already substantially roasted particles of said kind which layer is kept at roasting temperature and through which there pass upwardly oxygen-containing roasting gases in an amount sufficient to keep the solid particles within the layer in a turbulent motion, corresponding amounts of substantially roasted material being withdrawn from the turbulent layer. When working up such materials of said kind as are rich in sulfur, it is necessary for avoiding a softening of the roasted material to withdraw from the turbulent layer the excess heat not required for maintaining the roasting temperature, advantageously by the provision of built-in heat-absorbing members and while utilizing the heat energy for the production of steam or in gas turbines. On the other hand, in the case of materials poor in sulfur, of which the sulfur content is for example less than 10% and from which it is not economical to melt out the sulfur, the process may be used without the supply of heat, and gases with high contents of sulfur dioxide can be obtained of which the sensible heat may be directly or indirectly utilized, e. g. for melting out sulfur from minerals, and which can then, if necessary after adding air, be worked up into sulfuric acid by the chamber, tower or catalytic process.

In the processing of exhausted gas purifying masses from coke oven plant and gasworks according to our invention, it is found to be advantageous to supply the masses together with sulfur-containing minerals, in particular pyrites, to a turbulent layer consisting predominantly of roasted minerals and to maintain a relatively high oxygen content in the roaster gases. Under these conditions the carbon compounds contained in the gas purifying masses are burned under the catalytic action of the iron oxide, which is intensified by the intense turbulent motion, into carbon dioxide and water, so that the black coloration and contamination with tarry constituents of the sulfuric acid obtained from the roaster gases, of which there is a risk in the usual working up of gas purifying masses, is avoided.

The present process is especially advantageous for the recovery of valuable catalytic substances from exhausted sulfur-containing catalysts or for the regeneration of catalysts which have been poisoned by absorption of sulfur. Large amounts of such masses can be freed from sulfur with the minimum expenditure for apparatus. From 200 to 500 kilograms of sulfur can be roasted per hour per square metre of the cross-section of the turbulent layer.

The turbulent layer process renders it possible to carry out the roasting within a temperature range of about 400° to 1100° C. It also permits an accurate regulation of the temperature so that, if necessary, the roasting can be carried out tenderly in order to retain the activity of the catalytic or purifying masses while avoiding injurious high temperatures. The material to be roasted can be employed in a grain size up to about 10 millimetres, and it is advantageous to use a grain size up to 4 millimetres. Readily disintegratable agglomerates of fine individual grains can be supplied to the turbulent layer in a size of 20 millimetres or more.

The following examples will further illustrate this invention but the invention is not restricted to these examples.

*Example 1*

An exhausted tungsten-containing catalytic mass having a sulfur content of 24.6%, which has been broken up to a grain size of up to 2 millimetres and which in this form has a pile weight of 2750 grams/litre, is supplied at the rate of 50 kilograms per hour to a cylindrical turbulent layer above a grate which layer consists predominantly of roasted material (tungsten trioxide) and is preheated to the roasting temperature, the effective cross-section of the layer at a diameter of 270 millimetres being 0.057 square metre and the height being about 500 millimetres in the quiescent state. 80 cubic metres (NTP) of air at a pre-pressure of 300 millimetres water column flow upwardly through the turbulent layer per hour. The temperature set up is about 850° C. The roasted material, consisting substantially of tungsten trioxide and containing about 0.43% of sulfur, leaves the turbulent layer through an overflow.

*Example 2*

Exhausted gas purifying mass (so-called spent oxide) having a sulfur content of 46.8% and a water content of 14.2% is supplied at the rate of 1160 kilograms per hour to a cylindrical turbulent layer above a grate, which layer is heated to 900° C. and consists predominantly of already roasted gas purifying mass, the grate surface of the layer being 1.23 square metres and its height in the quiescent state being about 45 centimetres. 2100 cubic metres of air flow upwardly through the turbulent layer per hour. The whole of the roasted material corresponding to the gas purifying mass supplied, is removed by entrainment with the current of roaster gas from the furnace and deposited in separators arranged behind the same. The average dwell time of the mass in the furnace is about half an hour. The roaster gases contain about 17% of sulfur dioxide and 6.5 grams of sulfur trioxide per cubic metre. The roasted mass contains 2.68% of sulfur of which 2.49% is combined as sulfate.

We claim:

1. A process for working up material selected from the group consisting of minerals and exhausted gas purifying masses having an elementary sulfur content of about one-half by weight by roasting which comprises supplying said material to a single fluidized layer consisting predominantly of substantially roasted particles of said material, which layer is kept at a roasting temperature within the range of about 400° C. to 1100° C. and through which there pass upwardly oxygen-containing roasting gases in amounts sufficient to roast the material supplied, corresponding amounts of substantially roasted material being withdrawn from said layer, and withdrawing sufficient heat from said layer to avoid softening of the roasted material.

2. A process for working up exhausted gas purifying masses containing carbon compounds and having an elementary sulfur content of about one-half by weight by roasting which comprises supplying them to a single fluidized layer consisting predominantly of substantially roasted particles of said masses, which layer is kept at a roasting temperature within the range of about 400° C. to 1100° C. and through which there pass upwardly oxygen-containing roasting gases, corresponding amounts of substantially roasted material being withdrawn from said layer, and the oxygen-containing gases being employed in amounts sufficient not only to roast the supplied gas purifying masses but also to burn the carbon-containing constituents of sad masses, and withdrawing sufficient heat from said layer to avoid softening of the roasted material.

3. A process for working up exhausted gas purifying masses containing carbon compounds and having an elementary sulfur content of about one-half by weight by roasting which comprises supplying them at a rate equivalent to about 200 to 500 kilograms of sulfur per hour per square meter of layer cross-section to a single fluidized layer consisting predominantly of substantially roasted particles of said masses, which layer is kept at a roasting temperature within the range of about 400° C. to 1100° C. and through which there pass upwardly oxygen-containing roasting gases, corresponding amounts of substantially roasted material being withdrawn from said layer, and the oxygen-containing gases being employed in amounts sufficient not only to roast the supplied gas purifying masses but also to burn the carbon-containing constituents of said masses, and withdrawing sufficient heat from said layer to avoid softening of the roasted material.

References Cited in the file of this patent

UNITED STATES PATENTS

| | | |
|---|---|---|
| 1,832,217 | Joseph | Nov. 17, 1931 |
| 2,394,680 | Gerhold et al. | Feb. 12, 1946 |
| 2,455,419 | Johnson | Dec. 7, 1948 |